May 10, 1938. J. C. HOWE 2,117,169
CHAIN
Filed Oct. 28, 1935 2 Sheets-Sheet 1

JOHN C. HOWE
INVENTOR
BY Walter Hay
ATTORNEY

May 10, 1938.  J. C. HOWE  2,117,169
CHAIN
Filed Oct. 28, 1935   2 Sheets-Sheet 2

JOHN C. HOWE
INVENTOR
BY Walter Hay
ATTORNEY

Patented May 10, 1938

2,117,169

UNITED STATES PATENT OFFICE 2,117,169

CHAIN

John C. Howe, Sandusky, Ohio

Application October 28, 1935, Serial No. 47,056

1 Claim. (Cl. 74—257)

My invention relates to sprocket chains used principally for transmitting power and occasionally for elevating and conveying materials. It relates more particularly to those chains which bear the trade names of "steel bushed chains", "steel bushed roller chains" and "machine finished roller chains".

Such chains may be divided into two styles— those having straight links and those having offset links. A straight link chain has a series of alternately arranged inside links and outside links, also known as bushing links and pin links respectively; each inside link ordinarily comprises a pair of spaced side bars or side members provided near their ends with holes and interconnected by two bushings tightly received in the holes; each outside link ordinarily comprises a pair of spaced side bars or side members provided near their ends with holes and interconnected by two chain pins or pintle pins passed through the bushings of adjacent links and tightly received in the holes. An offset link chain has links all alike—any one link is interchangeable with any other link in the chain; each link ordinarily comprises a pair of spaced offset side bars or side members which are provided near their ends with holes and interconnected by a bushing tightly received in the holes at the contracted end of the link and by a pintle or chain pin tightly received in the holes at the expanded end of the link. Chains as above described are known as "bushing chains". By merely mounting a tubular roller on each of the bushings the chains become "roller chains".

My invention is principally concerned with improvements in bushings applicable to chains of the character described, and to facilitate comparison between the old and the new it should be explained that, prior to my invention the bushings in all standard roller chains—chains having links interchangeable with those of any other make of chain of the same type and size—were made by one or the other of two methods, by boring out the center of a round rod and cutting off to length, or by curling a piece of flat metal into a tube having tight abutting edges, rotundity being retained by its tight fit in round holes in the side bars. The use of seamless steel tubing for chain bushings, except in rare cases, has proved impracticable because of eccentricity, excessive tolerances and high cost of the tubing.

The principal object of my invention is the provision of an improved chain of the general type referred to and particularly machine finished roller chains so constructed that they can be adequately lubricated, or at least better lubricated by prevailing methods than has hitherto been possible with standard chains of the prior art. More specifically my aim is to provide an improved chain of the type referred to provided with bushings each of which is non-continuous circumferentially throughout its length or intermediate the side bars at a point adjacent to at least one thereof and thereby readily permit the entrance of lubricant to the highly important bearing or bearing surfaces between the chain bushing and the pintle or chain pin.

A clear conception of the invention may be had by referring to the accompanying drawings in which like reference characters designate the same or similar parts in the various views.

Figure 1:
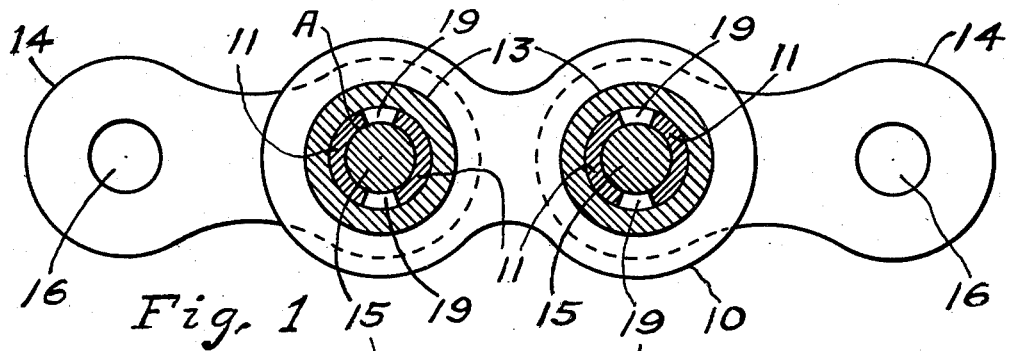
Figure 1 is a side sectional elevation of a short length of machine finished roller chain embodying my invention, the view being taken at line X—X of Fig. 2.

Returning to Figs. 1 and 2, which show the preferred embodiment of the invention, each inside link of the straight link roller chain there shown comprises a pair of spaced side bars 10 parallel to each other and firmly interconnected by two tubular-like bushings, designated generally by the reference character A, each comprising two spaced members or segments 11, one bushing being tightly received in each of the holes 12 (see Fig. 3) in the end portions of the side bars 10, the bushings being at right angles to the side bars. Interposed between the side bars 10, with suitable end clearance, and freely rotatable on the bushings A, or in other words, on the members or segments 11, are chain rollers 13 which serve to minimize friction and wear when the links engage and leave the teeth of a revolving sprocket wheel, and also when the chain is caused to roll on a track. Each outside link comprises a pair of spaced parallel side bars 14 which are firmly interconnected by pintle or chain pins 15 which pass through the bushings of adjacent inside links and are tightly received in holes 16 in the end portions of the side bars 14.

Figures 3, 4:
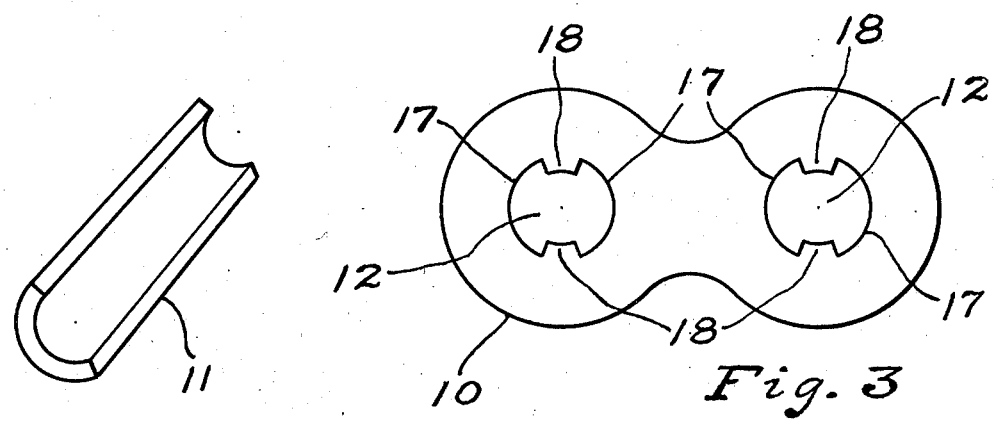
Fig. 3 is a detached view of a side bar for an inside or bushing link.
Fig. 4 is a detached perspective view of one of the members or segments of the bushings.

Referring to Fig. 3, the holes 12 through the end portions of the side bar are so formed as to provide preferably identical recesses 17 each of which is adapted to tightly receive one of the bushing members or segments 11 such as shown in Fig. 4, or modifications thereof. The inwardly projecting diametrically opposed ears 18, which constitute the ends of the recesses 17, have a mean width approximately equal to the thickness of the side bar, as required by punch and die practice, and in the present instance serve to define narrow gaps 19 between the longitudinal, parallel and adjacent edges of the members or segments 11 of the bushings A, the gaps therefore having a length coinciding with the inside width of the chain and preferably being disposed at right angles to the pitch plane of either an inside link or of an offset link, as clearly indicated in the various views. The pitch plane just mentioned is a plane that extends along and through the axes of the pivotal members at opposite ends of a link.

Figure 5:
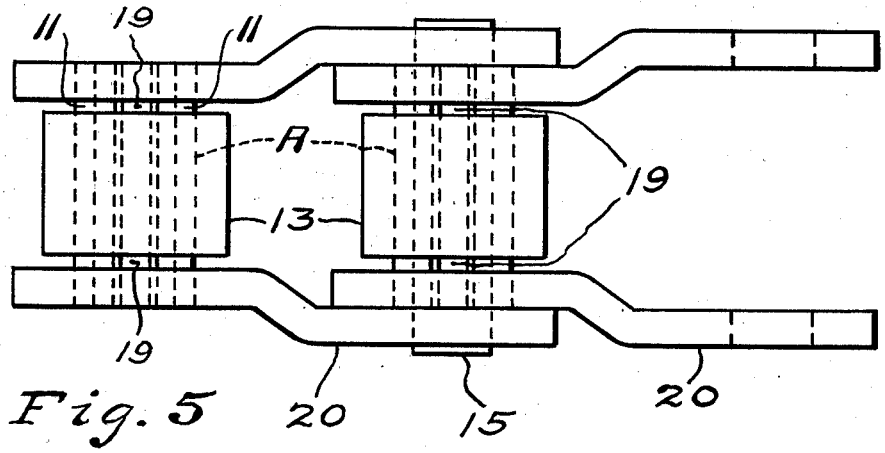
Fig. 5 is a plan of a short length of offset link roller chain embodying my invention.

In Fig. 5 is shown a two-link section of an offset link roller chain, the advantages of which are, the requirement of only one set of dies to make all of the side bars, a certain amount of resiliency in the chain to absorb shocks, and the permissibility to shorten or lengthen the chain by one link at any place in its length. As clearly indicated the bushings A comprising the members or segments 11 carrying the rollers 13 are received in the contracted ends of the links 20 and the pintle or chain pins as indicated at 15 are received in the expanded, overlapping ends of the links and passed through the bushings of adjacent links.

As previously indicated, prior to my invention the bushings in all standard roller chains having links that could be interchanged or intercoupled with those in any other make of chain of the same type and size were made in one piece. As still made, and found in most chains on the market at the present time, the bushings have walls that are circumferentially continuous, either throughout their entire length or through portions of their length at or adjacent to their ends. That is, where such bushings are provided intermediate their ends with openings through the bushing wall, or with notches in their ends to prevent their turning in their associated side bars, they are always circumferentially continuous at least through considerable portions of their length extending inwardly from the inner faces of their associated side bars.

In the early days of the industry it was not unusual to provide the rollers in many chains with oil holes, and in some cases the bushings were provided with centrally located oil holes or apertures, so that some of the oil could reach the chain pins. But the practice has largely been abandoned in the manufacture of the medium and smaller sizes of power transmitting chains and entirely so in the manufacture of standard machine finished roller chains, because in many cases dirt filled the oil holes in the rollers and excluded oil; but in most cases the caretaker would not assume the labor of turning the rollers, oftentimes more than a hundred in a chain and many pressing against the sprockets, around into oiling position. These conditions led to the present common practice of inadequately oiling small roller chains, especially standard machine finished roller chains to which my invention is particularly adapted, by depositing the oil, usually by means of an oil can or an oil-soaked brush, in the clearance spaces between the ends of the rollers and the side bars, which spaces are usually kept clear by the action of the rollers.

In drive chains which excel in precision, such as machine finished roller chains, the bore of the rollers is only a few thousandths of an inch larger than the exterior diameter of the bushings on which they are adapted to rotate. Consequently after lubricating the relatively minor bearings between the ends of the rollers and the side bars a restricted quantity of the oil, if sufficiently thin, may permeate the scant clearance between the rollers and the bushings. But due to the use of the circumferentially continuous bushings, as previously described, none of the oil applied at the ends of the rollers can reach the highly important bearings or bearing surfaces between the bushings and the pins. The only chance—and it is but a slim chance—of getting any oil, when applied by an oil can, a brush, or by means of a constant drip, to the bearings just mentioned is through clearances that may exist between the side bars at the ends of the bushings and then into the scant clearance between the bushings and the pins. Ordinarily the lateral play of one link relative to an adjacent link, that is, the amount of clearance between inner and outer side bars, is merely sufficient to permit free swiveling of coupled links, while the inside diameter of the bushings averages but .003" larger than the diameter of the pins, which leaves barely sufficient space for a film of oil even if the oil could be applied directly to these bearings.

The only method whereby chains having such bushings can be adequately lubricated is to run them partially submerged in an oil bath; but this usually requires the complete drive to be incased, which adds considerably to the cost of the installation and also requires additional space not always available. Probably less than five per cent. of all roller chain drives are incased and benefit from an oil bath. Having rather completely described the disadvantage of the circumferentially continuous bushing and the practical impossibility of adequately lubricating the bearings between such bushings and the pintle or chain pins by prevailing methods, the benefits to be derived from my invention, proved by comparative test described later, will be more clearly understood as the description continues.

Figure 2:
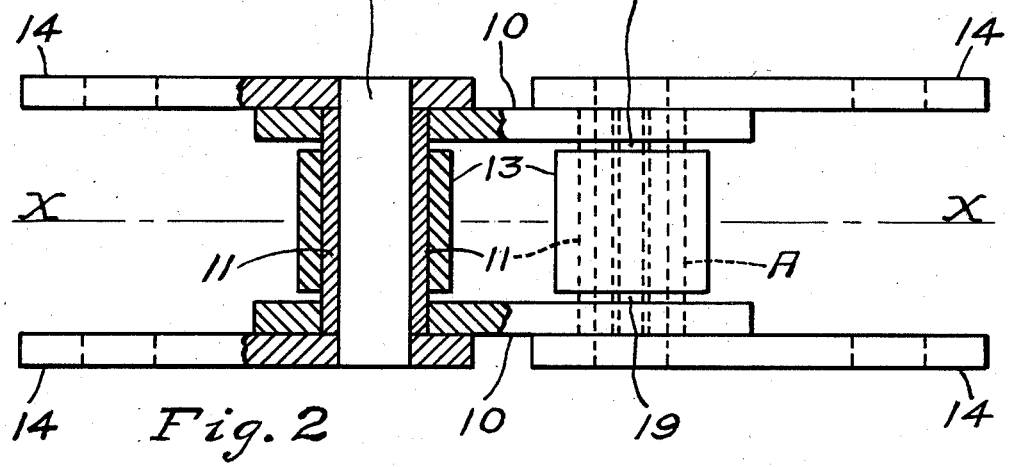
Fig. 2 is a plan of the chain, partly in section at one of the pivotal joints.

Referring to Figs. 1, 2 and 5 it is obvious that, when oil or any other suitable lubricant is deposited by any of the prevailing methods in the spaces between the ends of the rollers and the side bars, not only will the ends of the rollers be lubricated, but the oil will naturally flow into the gaps 19 and from end to end thereof, hence insuring adequate lubrication of the bearings between the rollers and the bushings and also the vastly more important bearings between the bushings and the pintle or chain pins. To those not skilled in the art it should be explained that the exceeding importance of the latter bearings arises from the fact that, as these bearings wear the chain elongates in proportion, improper engagement with the sprockets follows and the utility of the chain usually ends when elongation has continued to the point when the links start to ride on the ends of the sprocket teeth. Thus it will be clear that the life of any bushed drive chain, its strength being adequate, depends on the extent to which the pin-bushing bearings are kept lubricated.

Figure 6:
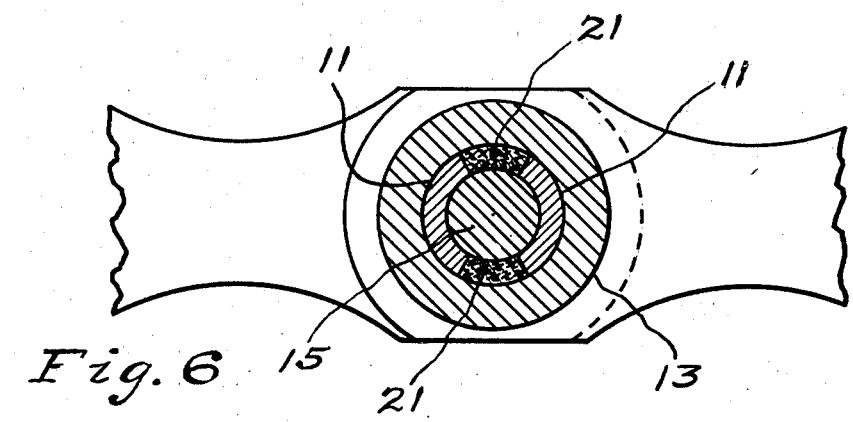
Fig. 6 is a fragmentary side view of my improved roller chain showing the joint members in section.

In Fig. 6 I have shown strips of felt or other suitable material 21 positioned in the gaps between the members or segments 11 of the bushing A and which lightly press against both the roller 13 and the pintle or chain pin 15. Where it is inconvenient to frequently lubricate a chain the great value of these strips when saturated with lubricant will be obvious. When the roller is rotated its interior surface will carry lubricant from the strips to the bearings between the roller and the bushing, and similarly the oscillatory movements of the coupled links will cause the pin to carry lubricant from the strips to the bearings between the pin and the bushing. The strips 21 are preferably made of material that will exude a charge of lubricant over the longest time, and in addition to this duty they serve to exclude dirt and grit from the bearings.

Figure 7:
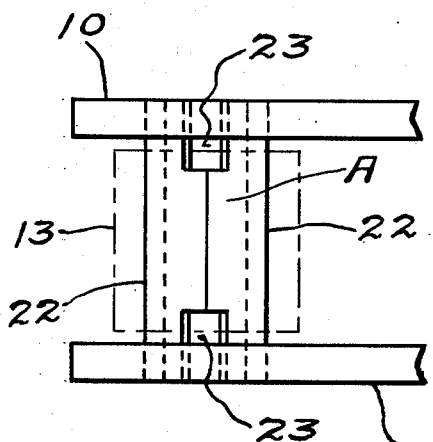
Figs. 7 and 8 are views of modified forms of bushings or bushing members.
Figure 8:
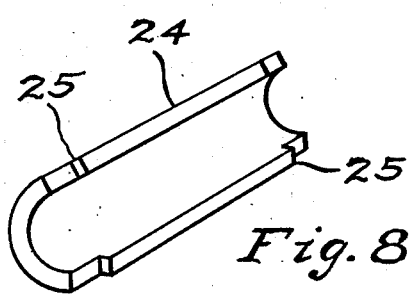

In Fig. 7 I have shown a bushing A comprising a pair of members or segments 22 received in their associated side bars 10 and having their middle portions equally extended to form a circumferentially continuous bearing surface for the roller 13 indicated by the broken lines. The gaps 23 extend inwardly from the side bars a sufficient distance to permit oil applied at the ends of the roller to reach the bearings between the bushing and the pintle or chain pin. The purpose of such modification is to provide extended bearing areas where the greatest roller-bushing wear occurs when the chain rolls on a track and is used for conveying material. An alternative construction would be to bore an aperture through a solid or one-piece bushing immediately inside the side member, or provide a groove in the ends thereof sufficiently deep to extend through the side members and a short distance past the ends of the roller, similar to Fig. 7;

In Fig. 8 I have shown another form of bushing member or segment 24 which may be substituted for the members or segments 11 shown in Figs. 1, 2 and 4. The member or segment 24 is provided near its ends with shoulders 25, the length axially between same coinciding with the inside width of the chain, and the length of the reduced end portions being equal to the thickness of the associated side bars. The purpose of the shoulders is to insure uniformly accurate spacing between the inner side bars, also to obviate any crowding of the latter against the rollers from any external cause.

The superiority of my improved chain when lubricated by prevailing methods has been demonstrated by an actual test as follows:

Two machine finished roller chains of 1¼" pitch and 58 pitches long, identical in every important respect except the bushings, including materials of the same analysis and case hardened pins and bushings in both chains, were used in the test. Since the chains were driven by identical sprockets mounted at opposite ends of an electric motor, both chains were run at the same speed of 1340 feet per minute, with a constant pull of 248 pounds on each chain. Chain A constructed with bushing members as shown in Fig. 4 was given about five drops of oil per minute aimed at the spaces at both ends of the rollers. Chain B constructed with bushings having circumferentially continuous walls was given the same grade and no lesser quantity of oil, but delivered so as to run down in the clearance spaces between the inner and outer side bars at both sides of the chain. After running 138 hours chain A had elongated a sixteenth ($\frac{1}{16}$) of an inch, while chain B had elongated twenty-seven thirty-seconds ($\frac{27}{32}$) of an inch, showing that chain A is capable of outwearing at least thirteen and one-half B chains under the same service conditions when both chains are lubricated by prevailing methods.

Another advantage of my improved chain, especially when constructed with bushing members or segments as illustrated in Figs. 4 and 8, over chains with circumferentially continuous bushings is lighter weight at the joints, which permits it to run at relatively higher speeds without injury because of a decreased hammering effect at the moment of engaging sprocket teeth.

A valuable characteristic of my invention when applied to machine finished roller chains is the permissibility to interchange the links with those of any other make of standard chains of corresponding pitch. At least one of the six different and well known makes of these chains now on the market is stocked in every important trade center in the United States and in cases of breakdowns the ability to quickly obtain one or more links of some one of these makes for making repairs often saves considerable time and money.

The various constructions shown in the drawings and described herein are the preferred embodiments of the invention; but the invention is not limited thereto, and the various constructions shown are merely illustrative of the invention. Briefly stated, the invention resides in the provision of a chain of the type referred to provided with a tubular-like bushing non-continuous circumferentially intermediate the side members but adjacent to at least one of them. In other words, the tubular-like bushing is provided with an aperture or gap at either or both ends of the roller, which readily permits the entrance of lubricant to the highly important bearing surfaces between the pintle or chain pin and the bushing, as well as to the bearing surfaces between the bushing and the roller. The bushings may be either solid or made of a plurality of members or segments and the apertures or gaps, which preferably extend the entire length of the bushing between the side members, may be formed in any manner.

I particularly point out and claim as my invention the following:

In a roller chain, in combination, a pair of side bars, and a pintle connecting the same, a second pair of side bars having an end received within an end of said first-named pair, an interrupted sleeve connecting said second-named pair and non-rotatable with respect thereto, lugs on said second-named pair engaging and circumferentially spacing the elements of said interrupted sleeve, said sleeve surrounding said pintle, a roller rotatable upon said sleeve, said interrupted sleeve bearing comprising a plurality of arcuate members circumferentially spaced from one another throughout their length, the inner surfaces of said arcuate members forming elements of a cylindrical space concentric with said pintle, and the outer surface of said arcuate members forming elements of a cylindrical space concentric with said roller, said arcuate members collectively constituting a bearing for said pintle and for said roller.

JOHN C. HOWE.